(12) United States Patent
Roblek et al.

(10) Patent No.: US 10,120,934 B2
(45) Date of Patent: *Nov. 6, 2018

(54) HOLD BACK AND REAL TIME RANKING OF RESULTS IN A STREAMING MATCHING SYSTEM

(71) Applicant: GOOGLE INC., Mountain View, CA (US)

(72) Inventors: Dominik Roblek, Ruschlikon (CH); Matthew Sharifi, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,092

(22) Filed: Aug. 29, 2017

(65) Prior Publication Data

US 2017/0357718 A1    Dec. 14, 2017

Related U.S. Application Data

(63) Continuation of application No. 15/348,776, filed on Nov. 10, 2016, now Pat. No. 9,754,026, which is a continuation of application No. 13/732,108, filed on Dec. 31, 2012, now Pat. No. 9,529,907.

(51) Int. Cl.
*G06F 17/30* (2006.01)
*G10L 25/54* (2013.01)

(52) U.S. Cl.
CPC .. *G06F 17/30743* (2013.01); *G06F 17/30758* (2013.01); *G06F 17/30769* (2013.01); *G10L 25/54* (2013.01)

(58) Field of Classification Search
CPC ......... G06F 17/30743; G06F 17/30758; G06F 17/30769; G10L 25/54
See application file for complete search history.

(56) References Cited

U.S. PATENT DOCUMENTS

| | | | |
|---|---|---|---|
| 2005/0065976 A1* | 3/2005 | Holm | G06F 17/30743 |
| 2006/0013451 A1* | 1/2006 | Haitsma | G06F 17/3002 382/124 |
| 2011/0276157 A1* | 11/2011 | Wang | G06F 17/30861 700/94 |

* cited by examiner

*Primary Examiner* — Sonia Gay
(74) *Attorney, Agent, or Firm* — Young Basile Hanlon & MacFarlane, P.C.

(57) ABSTRACT

A method includes receiving, from an audio streaming system, a probe audio sample and identifying sufficiently matching reference audio samples based on a first comparison of a first portion of the probe audio sample to reference audio samples. The method also includes, in response to determining that the sufficiently matching reference audio samples do not meet a predetermined score threshold, retaining the sufficiently matching reference audio samples, identifying additional matching reference audio samples based on a second comparison a second portion of the probe audio sample to the reference audio samples, and outputting at least one of the reference audio samples based on the first comparison and the second comparison.

18 Claims, 10 Drawing Sheets

HOLD BACK AND REAL TIME RANKING OF RESULTS IN A STREAMING MATCHING SYSTEM

CROSS REFERENCE TO RELATED APPLICATION

The present application is a continuation of U.S. patent application Ser. No. 15/348,776 filed on Nov. 10, 2016, which in turn is a continuation of U.S. patent application Ser. No. 13/732,108 filed on Dec. 31, 2012, the contents of both of which are incorporated herein by reference in their entirety.

TECHNICAL FIELD

This disclosure relates generally to matching objects in a streaming matching system based upon rank, and, in particular, holding back matches and continuously ranking results to provide better confidence to the results.

BACKGROUND

One type of matching is based on matching melodies or audio content (e.g., songs) that can be stored in large data stores with multiple different versions or related copies having some degree of variance. Systems of such type are typically referred to as audio matching systems. In some cases, matching is particularly challenging due to differences in melodies or some characteristic variance in the compositions being analyzed. For example, the data store could have near exact matches that result from multiple different versions, such as from an extended play track or an original song track, an explicit song or non-explicit, which has been varied in content. In situations where a user provides access to audio content and a server matches the content without receiving the complete audio file, matching an exact match can be challenging when the data stores hold multiple near exact matches.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate matching a comparison object with a plurality of reference objects to identify matching results. The results are retained and updated until additional amounts of the comparison object are processed. The results are scored and compared in order to determine which results pass a score threshold and can be emitted as results before others, released immediately, and/or released together for increased confidence in the results.

One aspect of the disclosed implementations is a method including receiving, from an audio streaming system, a probe audio sample and identifying sufficiently matching reference audio samples based on a first comparison of a first portion of the probe audio sample to reference audio samples. The method also includes, in response to determining that the sufficiently matching reference audio samples do not meet a predetermined score threshold, retaining the sufficiently matching reference audio samples, identifying additional matching reference audio samples based on a second comparison a second portion of the probe audio sample to the reference audio samples, and outputting at least one of the reference audio samples based on the first comparison and the second comparison.

Another example of an embodiment includes a system, including receiving component, a comparing component, a matching component, a retaining component, and a scoring component. The receiving component is configured to receive, from an audio streaming service, a probe audio sample. The comparing component is configured to compare a first portion of the probe audio sample to reference audio samples. The matching component is configured to identify sufficiently matching reference audio samples based on a first comparison between feature vectors of the first portion of the probe audio sample and respective first feature vectors of the reference audio samples. The retaining component is configured to retain the sufficiently matching reference audio samples based on a determination that none of the sufficiently matching reference audio samples meet a predetermined score threshold. The comparing component is also configured to identify additional matching reference audio samples based a second comparison of feature vectors of a second portion of the probe audio sample to second feature vectors of the reference audio samples. The scoring component is configured to output at least one of the reference audio samples based on the first comparison and the second comparison.

Also disclosed non-transitory computer readable storage medium including computer executable instructions that, in response to execution, cause a computing system comprising a processor to perform operations. The operations include receiving a probe sample and comparing a first portion of the probe sample to reference samples to identify sufficiently matching reference samples based on a first comparison of feature vectors of the first portion of the probe sample and respective first feature vectors of the reference samples. The operations also include, in response to determining that the sufficiently matching reference samples do not meet a predetermined score threshold, retaining the sufficiently matching reference samples and comparing a second portion of the probe sample to the reference samples to identify additional matching reference samples based on a second comparison between feature vectors of the second portion of the probe sample and second feature vectors of the reference samples. The operations also include outputting at least one of the reference samples based on the first comparison and the second comparison.

The following description and the annexed drawings set forth in detail certain illustrative aspects of this disclosure. These aspects are indicative, however, of but a few of the various ways in which the principles of this disclosure may be employed. This disclosure is. intended to include all such aspects and their equivalents. Other advantages and distinctive features of this disclosure will become apparent from the following detailed description of this disclosure when considered in conjunction with the drawings

DETAILED DESCRIPTION

Figure 1:
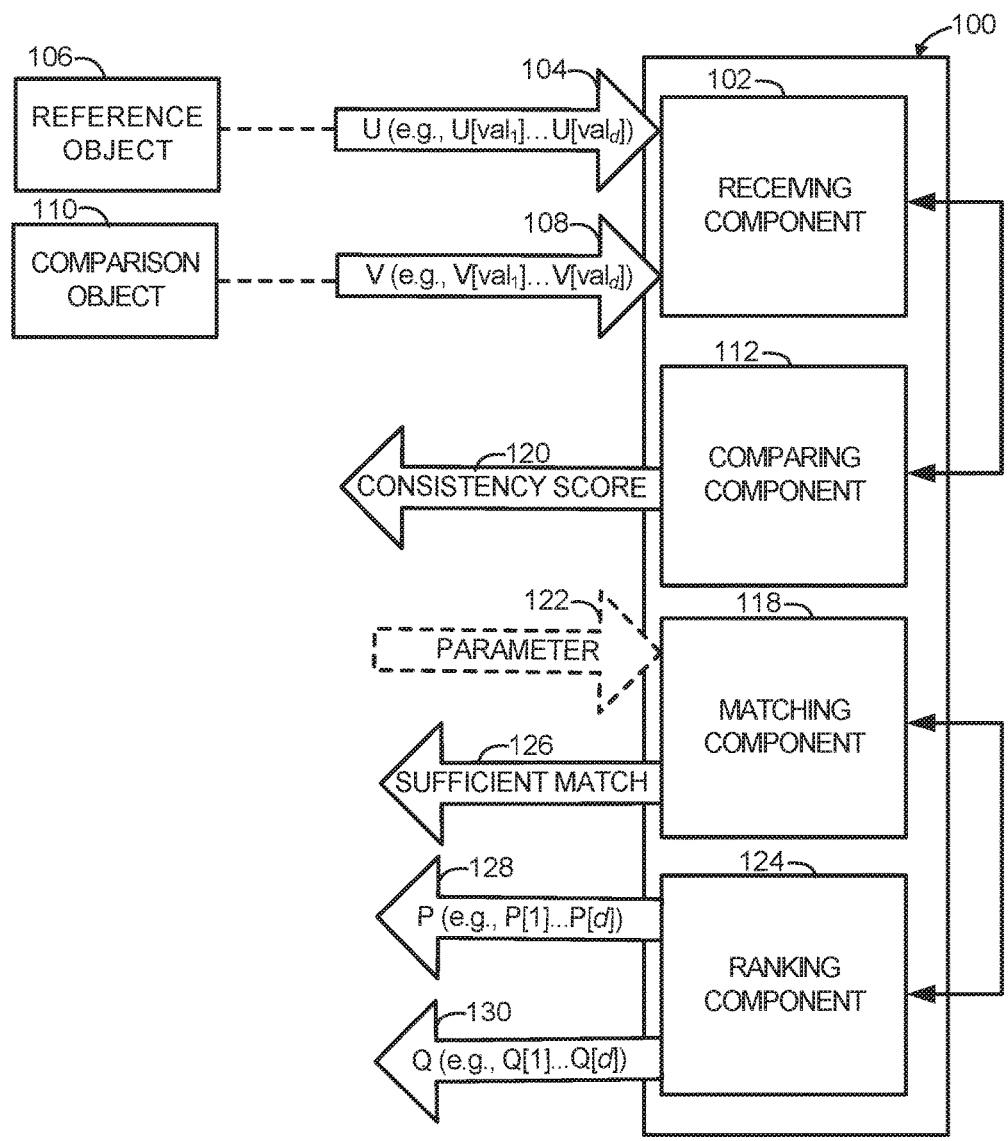
FIG. 1 is a block diagram illustrating an example, non-limiting embodiment of a matching system in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

In accordance with one or more implementations described in this disclosure, an audio matching system receives as input an excerpt of an audio signal (a probe) and tries to locate a corresponding audio excerpt in a large repository of reference audio signals. For example, a mobile phone could record music playing in a noisy environment (e.g., a noisy bar, or elsewhere) that can be utilized by the matching system to return information about the music playing by matching the noisy probe to a large repository of references. The matching system can operate to minimize latency by performing matching of the audio sample (music recording) with reference objects (e.g., audio references) in real time as the audio clip is received from a client. The matching can be performed based on various parameters such as time and/or incremental amounts of the audio being received, as well as in real time as the recording audio stream is being received.

With a database of tens of millions of audio references, for example, the system could likely find multiple matches that satisfy a predefined match threshold. A multiplicity of resulting matches could result due to a number of reasons, such as duplicates in the reference set, or the same track could be on both a compilation album along with a main extended play album. Another example is that the resulting audio references could come from an original version and a less popular re-mix, both of which match the probe audio sample. Although audio content is discussed herein as examples, other media content is also included in the meaning, such as video content, image content, and the like.

In the context of a streaming matching system, it can be difficult to know whether to return a match once it has passed a predetermined threshold for determining matches, exactly which of the available matches to return, or whether to wait until a better match becomes available. In various aspects of this disclosure a real-time ranking system of components operate in a matching system to rank and hold back or retain references that can be less popular from being outputted until a greater confidence is ascertained to output matches. A receiving component receives a first portion of media streaming content for determining whether a match is available among media content references. A comparing component identifies at least one reference audio sample in real time as the at least one reference audio is received by generating a comparison of the first portion of audio streaming content and a plurality of reference audio sample. A matching component identifies a sufficient match between the first portion of audio streaming content and the plurality of reference audio samples based on the comparison, and a ranking component constructs first ranking scores to matching reference audio samples of the plurality of reference audio samples.

Non-Limiting Examples of Hold Back and Real Time Ranking of Results in a Streaming Matching System Referring now to FIG. 1, a system 100 is depicted. System 100 can match objects represented by feature vectors, for example, and output the resulting matches based on a continuously updated result ranking that is determined concurrently while the system is receiving the objects for comparison, such as in a video or audio stream. System 100 can include a memory that stores computer executable components and a processor that executes computer executable components stored in the memory, examples of which can be found with reference to FIG. 9. In addition, system 100 can include a receiving component 102, a comparing component 112, a matching component 118, and a ranking component 124.

Receiving component 102 can be configured to receive first feature vector 104, denoted, U. U can be associated with reference object 106. Receiving component 102 can also receive second feature vector 108, denoted, V, which can be associated with comparison object 110. First feature vector 104 (e.g., U) and second feature vector 108 (e.g., V) can be d-dimensional vectors, where d can be, e.g., any positive integer. The d dimensions of U or V can relate to distinct features associated with reference object 106 and comparison object 110, respectively, as further detailed in connection with FIG. 2.

Figure 2:
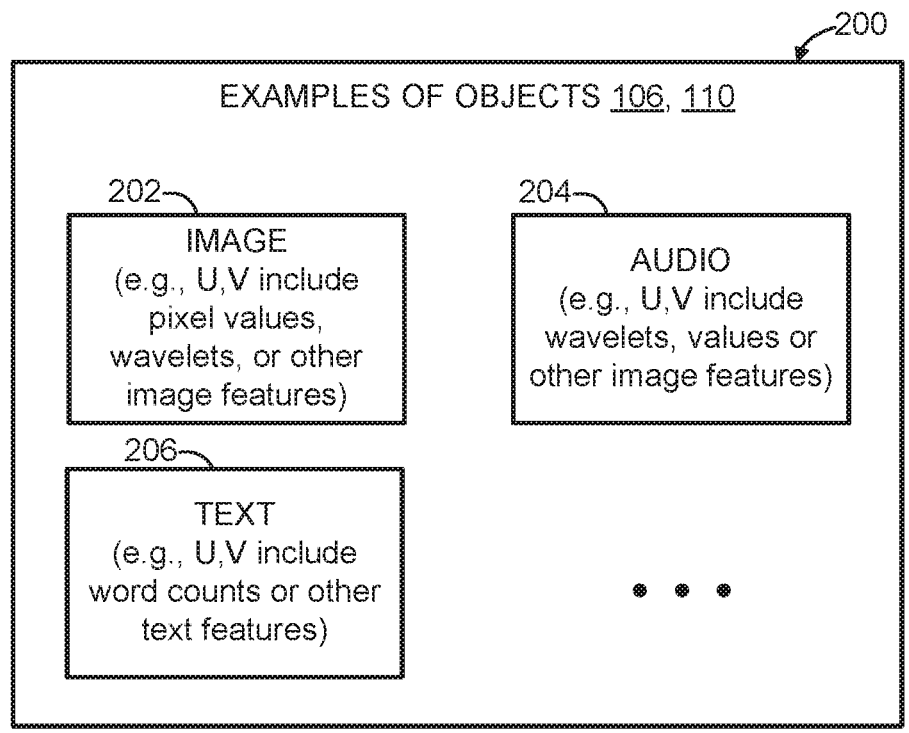
FIG. 2 is a block diagram illustrating an example, non-limiting embodiment of a system in accordance with various aspects and implementations described herein.

While still referring to FIG. 1, but turning now as well to FIG. 2, diagram 200 is depicted. Diagram 200 illustrates various examples of a reference object or a comparison object. For example, objects 106, 110 can relate to at least one of image 202, audio 204, and/or text 206. In the case where objects 106, 110 relate to image 202, feature vectors 104, 108 (e.g., U and V) can include an image feature such as pixel values for example. For instance, first feature vector 104 can include pixel values for the pixels of a reference image and second feature vector 108 can include pixel values for the pixels of a comparison image. In other embodiments, feature vectors 104, 108 can include wavelets or other features (including, for example, local features) associated with the reference image and comparison image. In addition, the feature vectors can include audio fingerprints that have one or more identifiers of the content or a compact content-based signature that summarizes or identifies the audio content. In the case where objects 106, 110 relate to audio 204, then first feature vector 104 can include wavelet values (or other features associated with audio) for the wavelets of a reference audio and second feature vector 108 can include wavelet values (or other features associated with audio) for the wavelets of a comparison audio, for example. In the case where objects 106, 110 relate to text 206, then first feature vector 104 can include a word count for various words (or other features associated with text) included in a reference text and second feature vector 108 can include a word count for various words (or other features associated with text) in a comparison text, for example. Examples 202, 204, and 206 are non-limiting and other examples can exist such as substantially any object that can be represented by a d-dimensional feature vector.

Turning back to FIG. 1, the comparing component 112 can be configured to identify reference objects 106 (e.g., audio sample) among one or more volumes of reference objects (e.g., a reference audio sample) in real time as the first portion or segment of the comparison object (e.g., audio streaming content) is received. The comparing component 112 generates a comparison of the first portion (e.g., a predefined number of feature vectors, a predefined time period, and/or amount) of audio streaming content and a plurality of reference audio samples.

Matching component 118 can be configured to identify a sufficient match between the first portion of the comparison object 110 and multiple reference objects 106 based on the comparison. For example, the matching could be identified based upon a consistency score 120 between one or more feature vectors U and V. Hence, sufficient match 126 for U and V can imply a sufficient match between reference object 106 (or a portion of reference object 106) and comparison object 110 (or an associated portion of comparison object 110).

Additionally or alternatively, consistency score 120 can be determined based upon parameter(s) 122. Parameters 122 can indicate whether to use an indicator function or a distance measure for determining consistency score 122, for example, in order to determine a sufficient match. The ranking component 124 can be configured to construct a first set of matching reference results 128, denoted, P, and a set of second matching reference results 130, denoted Q. P can be constructed based upon a first sequential ordering of dimensions of U (e.g., a first portion of first feature vector 104), and Q can be constructed based upon a second sequential ordering of dimensions of U (e.g., a first portion of second feature vector 108), in which the first sequential ordering and the second sequential ordering can comprise a first subset and a second subset of the comparison object 110 respectively. P and Q can be matching results of different consecutive sequences with respect to one another. The first sequential ordering or the second sequential ordering can be a subset of the other and both subsets of the comparison object 110.

Figure 3:
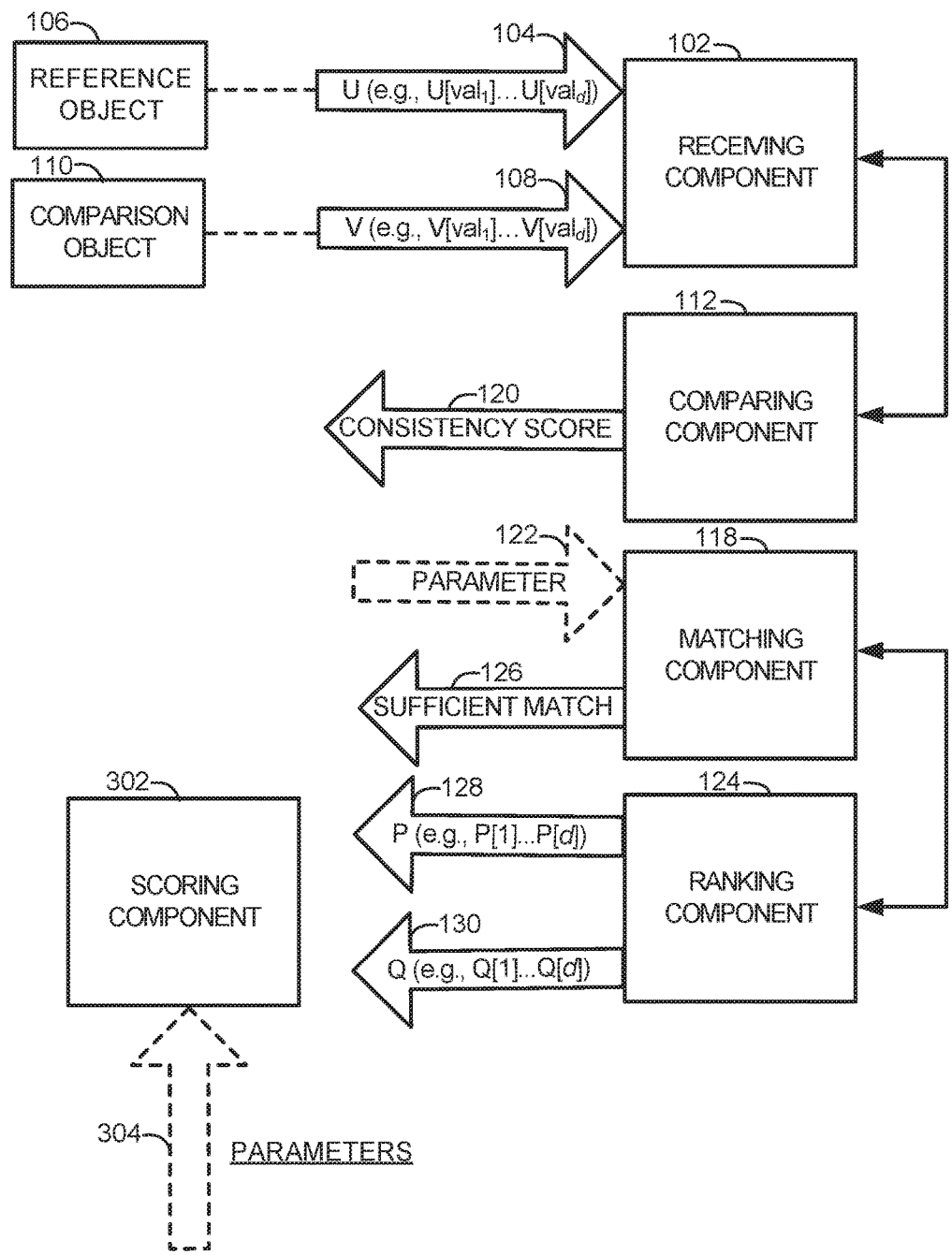
FIG. 3 is a block diagram illustrating an example, non-limiting embodiment of a system with a matching component in accordance with various aspects and implementations described herein.

FIG. 3 illustrates a system 300 that operates as a matching system in accordance with various embodiments disclosed herein. For example, the system 300 operates to continuously match comparison objects, such as a sample audio stream with reference objects (e.g., a reference audio), continuously ranks the match results and generates greater confidence for outputting match results by retaining matches until a predetermined score threshold is satisfied. For example, the system 300 includes the components discussed above and further includes a scoring component 302 that compares ranking scores, updates rankings and determines the sufficient match results.

The scoring component 302 is configured to receive matching results generated by the ranking component 124 in real time as a first portion of the comparison object 110 is processed and ranked via the receiving component 102, the comparing component 112, the matching component 118 and the ranking component 124. The scoring component 302 can receive a first set of ranks 128 and as additional portions of the comparison object 110 are processed to determine reference object matches, the scoring component can dynamically update the rankings of the match results, update the match results with additional results with a level of confidence satisfying the predetermined threshold for a sufficient match 126, and/or determine that a higher second predetermined score threshold is satisfied for immediate output.

In one embodiment, the system 300 operates to retain the first set of rank scores and the corresponding match results (matching reference objects) associated with the scored rankings for further processing or matching of additional portions of the comparison object 110. The first set of rankings can be received with match results and the scoring component can release any of the ranked results that satisfy a second predetermined threshold score for a ranked match. The second predetermined threshold (a score threshold) can be distinguished from a sufficient match threshold for a matched reference with a higher confidence threshold level, in which a sufficient match could provide one level of consistency among objects in the comparison and the score threshold provide a greater likelihood of a match based on parameters 304. The second predetermined threshold (score threshold) can be met with further criteria such as the parameters 304 and/or comprise a greater amount of feature vectors in the matching results as determined from further portions of the comparison object being calculated within the comparison among reference objects.

For example, the scoring component 302 can utilize various parameters 304 in order to ascertain whether the rankings of matches are sufficient for output as a match and/or whether additional matching operations/processing with additional portions or segments of the audio stream are desired for greater confidence. If no match results meet the second predetermined threshold for immediate output, the first set of ranked matches can be retained and dynamically updated based on additional iterations of matching processes with further portions of the comparison object 110.

For example, the scoring component 302 operates to generate a score comparison of the first match reference results 128 of the matching reference audio samples with the second match reference results 130. The second results 130 can include second ranking scores associated with a second or additional portion of the audio streaming content (e.g., the comparison object 110). The scoring component 302 can operate to iteratively and dynamically alter the scores of the ranked matches by changing the rankings based on additional iteration results for the same comparison object or media stream, based on greater amounts of streaming content being analyzed, and/or a predetermined amount of time that media streaming content is received by the system 300. Additionally or alternatively, the scoring component 302 can operate by weighting the rankings received in the first set of rankings 128 in order to update the ranked results according to the second set of rankings 130 from a comparison between the first and the second set of rankings, and release any retained results that satisfy a score threshold or that satisfy the score threshold to a greater degree than other resulting reference matches determined.

In one embodiment, the second match reference results 130 of a second portion of the comparison object 110 (e.g., V[val$_d$]) includes the first portion and can comprise a subset of the audio sample (e.g., comparison object) in order to further determine a strength of the results and/or determined additional matching reference results. The ranking component 124 can work in conjunction with the scoring component 302 to dynamically alter the first ranking scores associated with the matching reference audio samples based on a score comparison. In response to reaching a second predetermined threshold based on at least one of an amount of the comparison object 110 processed, or on an amount of time, the match results can be released for output. The match results determined for output can be sorted prior to release based on the associated ranking scores and can further contain a greater confidence of accuracy with respect to the results and their rankings upon release. For example, where multiple different match results can occur with various albums, extended play originals, remixes, etc. a predetermined number of results can be released with a greater accuracy or confidence of a likely match, rather than releasing results immediately once a first portion of the media stream is compared and identified as a sufficient match.

The scoring component 302 can generate continuous comparisons of rank score from various portions of the comparison object based on parameters or measures. The parameters or measures can include, for example, one or more weights or scores that are based on and/or indicate whether the respective matching reference audio samples are individually available for sale, respective popularities of the matching reference audio samples, whether the respective matching reference audio samples are from an original album and/or a compilation album, and/or respective sales amounts of the matching reference audio samples.

In addition, the identified match results can be ranked according to a strength of the match and then the scoring component can further score the matches based on the parameters. For example, a first set of rankings can be received from a first portion of media streaming content being received and found with a plurality of matching reference results, such as references A, B and C. Each of these references can be ranked based on the strength of values between feature vectors between the portion of the comparison content/object and the reference content/object. The references can be ranked and communicated to the scoring component 302 before being outputted as matching references. The scoring component 302 can then retain matches until scores are determined, other additional portions of the comparison object are processed, and/or an amount of time for the match processing operations of the matching component passes. For example, one or more (e.g., A and B) could only be outputted as a match where C does not pass a predetermined threshold.

The scoring component 302 can operate to hold each of the matches and further analyze them based on the parameters/measures 304. In some situations, one or more of the matches could satisfy a second predetermined threshold based on the set of parameters. The scoring component 302 can then output these matches as results from the system 300, and/or continue to retain the match results. The scoring component 302 can then continue receive matches and associated rankings to compare the retained results with. For example, the reference A could continue to be received as a match, but however be ranked higher based on additional data (additional amount of audio stream, or additional portions of the comparison object being received) matching with the reference with respect to the other references B and C. The scoring component 302 can thus factor the increase in rank within the score to determine whether reference A satisfies the second predetermined threshold and to what degree reference A does or does not satisfy it.

Figure 4:
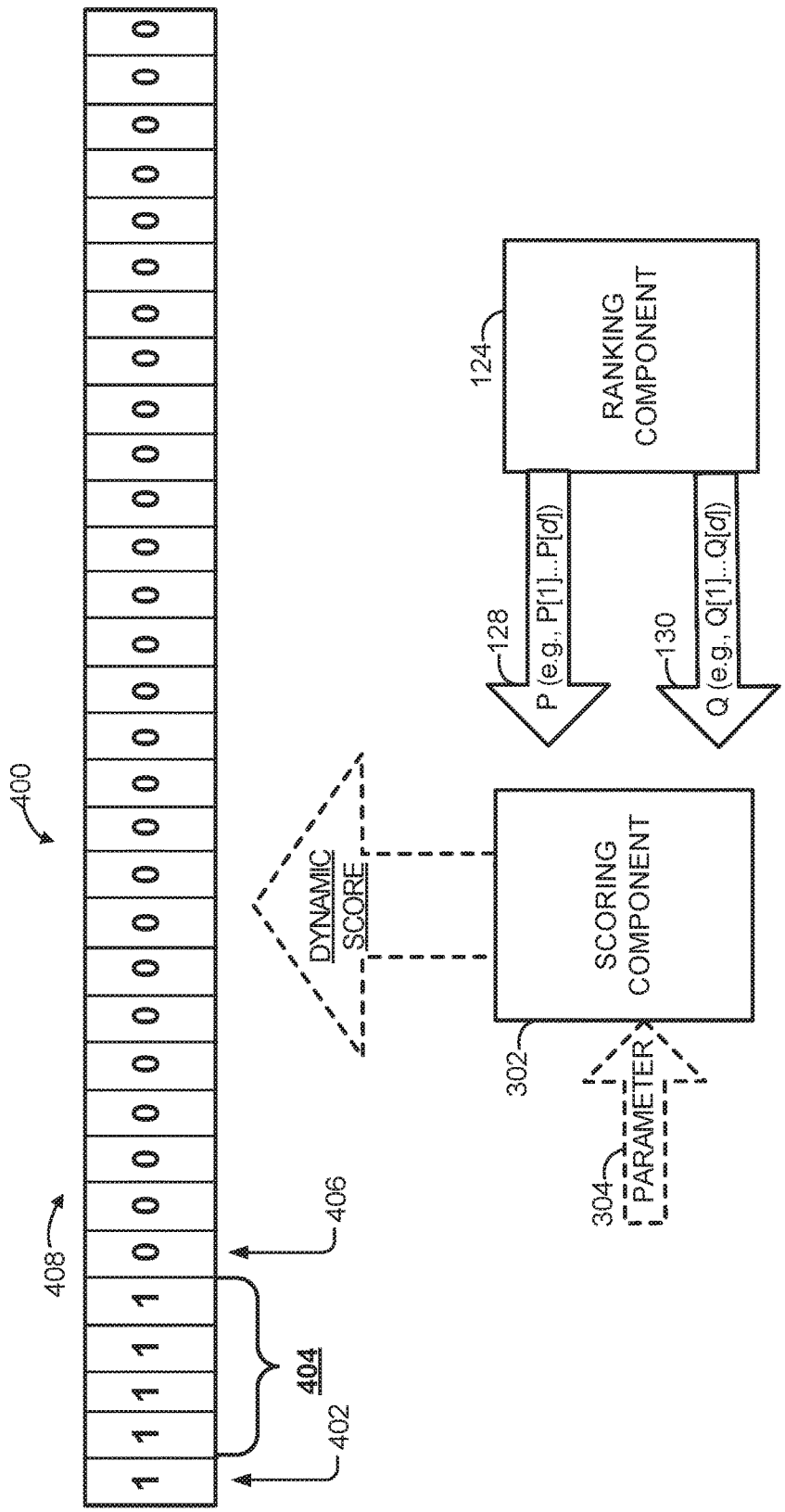
FIG. 4 is a block diagram illustrating an example, non-limiting embodiment of a system with a matching component in accordance with various aspects and implementations described herein.

Referring to FIG. 4, illustrated is an exemplary scoring component of a matching system that generates a score or measure for outputting matching references. The scoring component 302 can generate scores 400 that are specific to music content and/or can also define suitable scores for other types of content (e.g., movies, TV shows), such as represented by the comparison object 110 discussed above. In one example, the score 400 can be represented as an integer having one or more bits, which can comprise a number of components. Other integers of different bit lengths are also envisioned in which one or more of the components can be arranged in various orders and/or have different significance in their representation.

For example, a high order bit 402 can operate to track availability for sales. If the high order bit 402 is one (1), for example, the object 110 (e.g., song track, or the like) is individually available for sale, and is zero (0) otherwise. In addition, a set of next four bits 404 can operate as a popularity measure. This measure can come from heuristics such as a number of web searches for the object or audio track and/or a number of hits (e.g., views, downloads, etc.), which can be designated as a binary number with the four or more bits illustrated. In another embodiment, another bit (e.g., a sixth bit) can designate the match reference as an original extended play, or a compilation album, in the case of audio references. For example, a one could designate that the track is an original extended play, or zero if it is a compilation album, or vice versa. The remaining bits 408 can be used to encode sales count data, and/or other data related to the potential matching content reference. Consequently, the higher the score, the more preference the matching system has to return that reference, and the greater degree or confidence level the reference has in satisfying a second predetermined threshold for being released as a match result. The order and significance (parameter or measure corresponding thereto) of each component of the score can be varied and is not limited to the example provided above for describing the score 400. For example, the score can be represented as an integer that can comprise any number of components. Each of these components can include a group or a set (one or more) of bits occupying the most to least significant bit positions based on the relative importance of the feature.

The scoring component 302 can compare two scores by basically using the parameters 304 (measure criteria) in order of preference to make a decision about which is match references are better to release or output from being retained. The score 400 thus provides a means to compare any pair of reference matches (e.g., audio tracks with a first set of match references and/or a second set of the same reference with a different number of matched feature vectors, and/or different references), re-compute a ranking for a list of matches based on the score, and/or communicate the score to the ranking component 124 to re-configure rankings for stored matches to be outputted In another embodiment, a predefined score threshold T (the second predetermined threshold or a score threshold) is defined by the scoring component 302, above which the scoring component does not hold back matches from being released or outputted as a match. For example, the threshold could be the score 400 illustrated as T=11111000000000000000000000000000. Any match above this threshold is considered to be good enough that it can be returned to the user immediately. A match below the threshold can be held back until the system discussed above has received and matched at least N seconds of the probe (e.g., the comparison object, audio sample stream, etc.) and/or additional portions (amounts) of the probe. For example, a value of N=5 seconds could be used. Additionally or alternatively, an amount of the probe or comparison object could also be designated so that matches generated from a first portion (e.g., one or more features) are retained, until further portions are also matched together with the first portion or separately. By retaining the initial matches, a greater confidence either by reinforcing the initial rank results of the matches, weakening them, and/or discarding those that do not satisfy an additional threshold (e.g., T) can be performed.

In most cases, a client (e.g., client device) will display the first match, but for the sake of completeness, the systems described above operate to return a full list of ranked matches in real time. At matching time, the system can receive a probe clip (e.g., comparison object) from a client and will initiate fingerprinting and matching of the clip. In response to the matching component identifying a match or a set of matches, the ranking component ranks them, immediately returns and removes those which are above the threshold T. The system now waits to release the results until more matches are received. Each time a new set of matches are received, they can be merged into the set of remaining, unreturned/retained matches, ranked and a comparison against the second predetermined threshold or score threshold can be performed. After N seconds and/or N periodic intervals of data have been received and matched, the system can retrieve the ranked set of all matches found so far and return them. Any subsequent matches received after this point can be ranked and returned to the user immediately.

Figure 5:
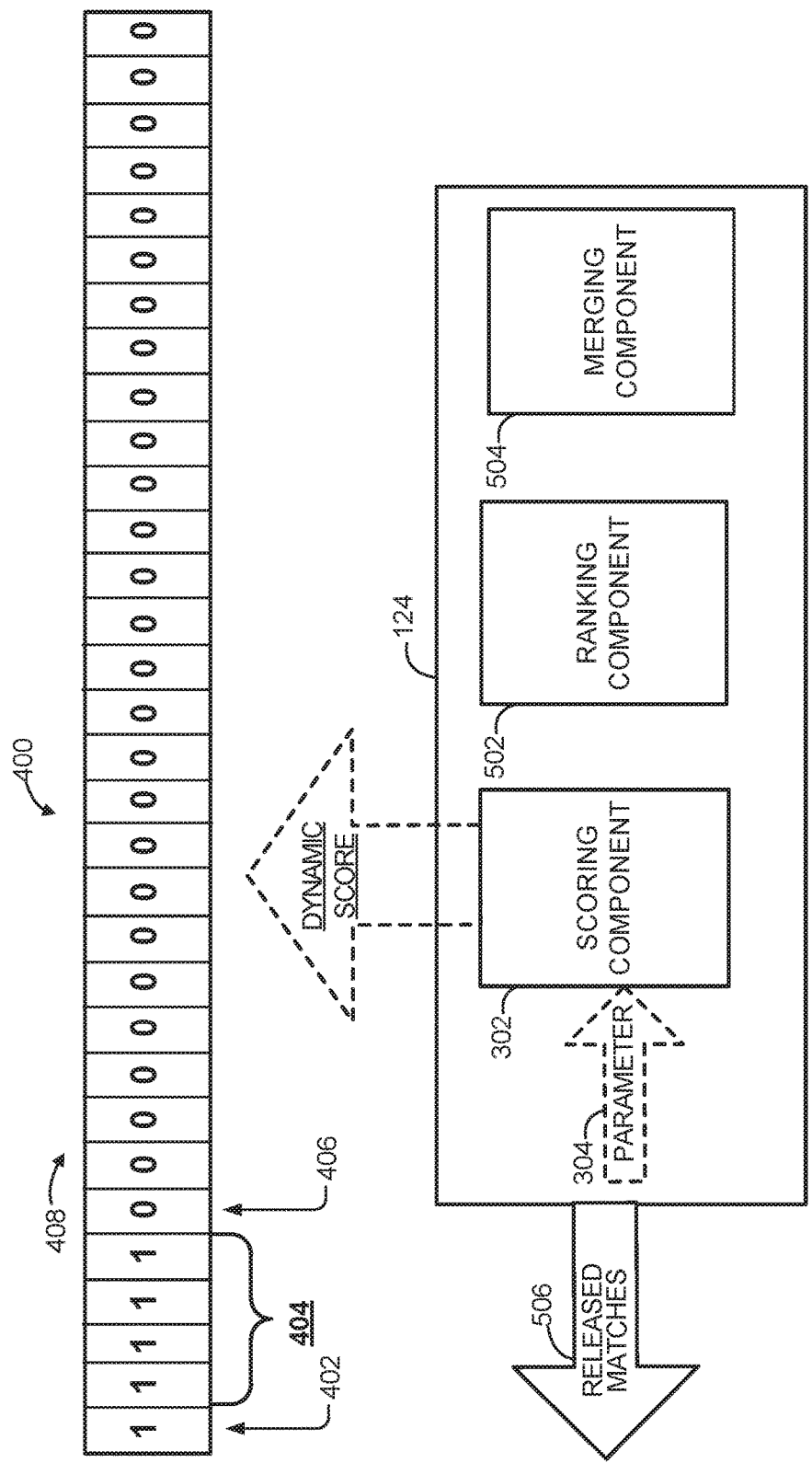
FIG. 5 illustrates examples of a ranking component in accordance with various aspects and implementations described herein.

Referring now to FIG. 5, illustrated is a ranking component 124 in accordance with various aspects described herein. The ranking component 124, in one example, can house the scoring component 302 that operates to score the matching references that satisfy a sufficient match threshold. The ranking component 124 can further include a retaining component 502, and a merging component 504.

The retaining component 503 retains the matching reference audio samples having the sufficient match or satisfying a match threshold. Any matching reference results that satisfy a score threshold based on the parameters 304 can be subject to immediate release as one or more released matches 506. The retaining component 502 can retain initial match reference results and their associated first ranking scores from being outputted until at least a second set of matching reference audio samples is determined from additional portions of a comparison object (probe sample). Therefore, the ranking component 124 can operate to continuously compare rank scores of match reference results, and determine which results satisfy a score threshold for release as one or more released matches 506.

The retaining component 502 can retain the matching reference results based on the predetermined parameters that include at least one of a time for comparison operations, or an amount of the audio streaming content compared. In addition, the parameters can include an indication of whether the respective matching reference audio samples are individually available for sale, respective popularities of the matching reference audio samples, whether the respective matching reference audio samples are from an original album or a compilation album, or respective sales amounts of the matching reference audio samples, in which each can be weighted differently for determination of a rank score and whether each match reference satisfies the score threshold (second predetermined threshold as discussed).

Subsequent to releasing the best or optimal matching reference results based on score rankings after an amount of time, and/or an amount of the comparison object processed, the retaining component 502 can operate to release all matches as release matches 506 or a subset of the matches as determined to satisfy the score threshold to a greater degree than other reference matches.

The merging component 504 can operate further to merge the matching reference audio sample with at least one additional matching reference audio sample having second ranking scores from a sufficient match with a second portion of the audio streaming content. For example, as additional portions or segments of the audio probe or comparison object are processed, additional matching reference could be discovered and included within the first set of matches being retained. Alternatively or additionally, the merging component 504 can operate to merge the score ranks by updating the ranks with the newly ranked match reference results, such as when additional amount of audio probe or comparison object data could indicate a stronger match and/or reveal an increase in one or more of the parameters 304.

Figure 6:
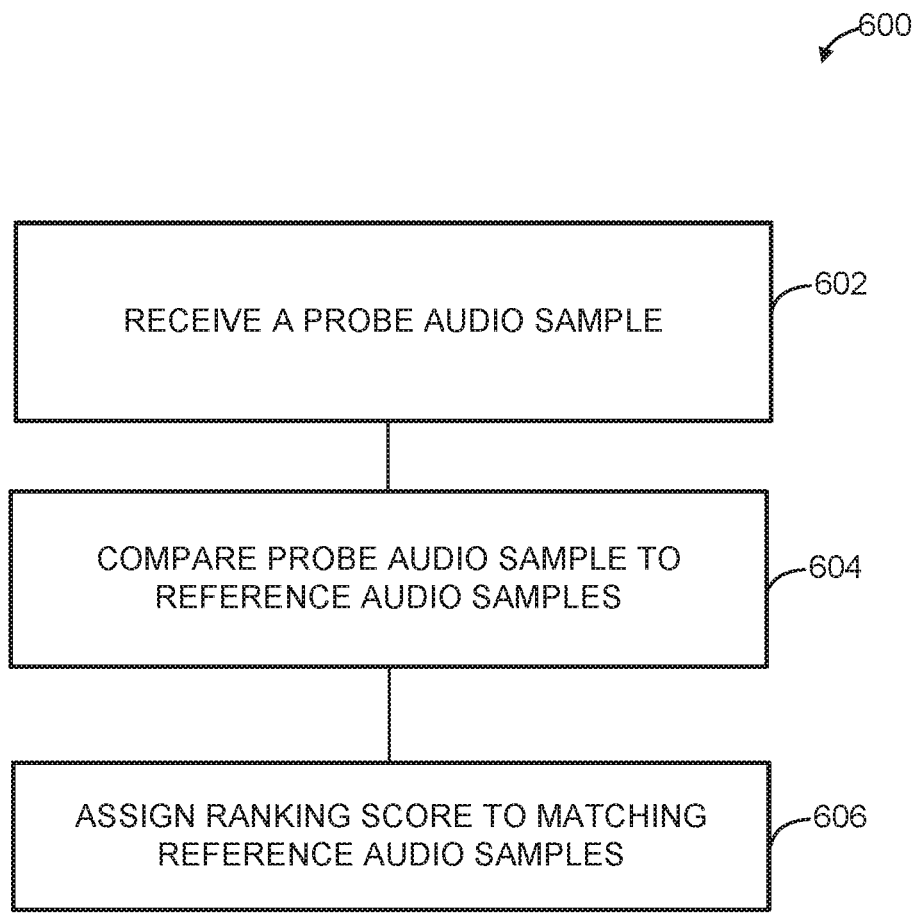
FIG. 6 illustrates examples of a flow diagram of an example, non-limiting embodiment for processing matches of media content in accordance with various aspects and implementations described herein.
Figure 7:
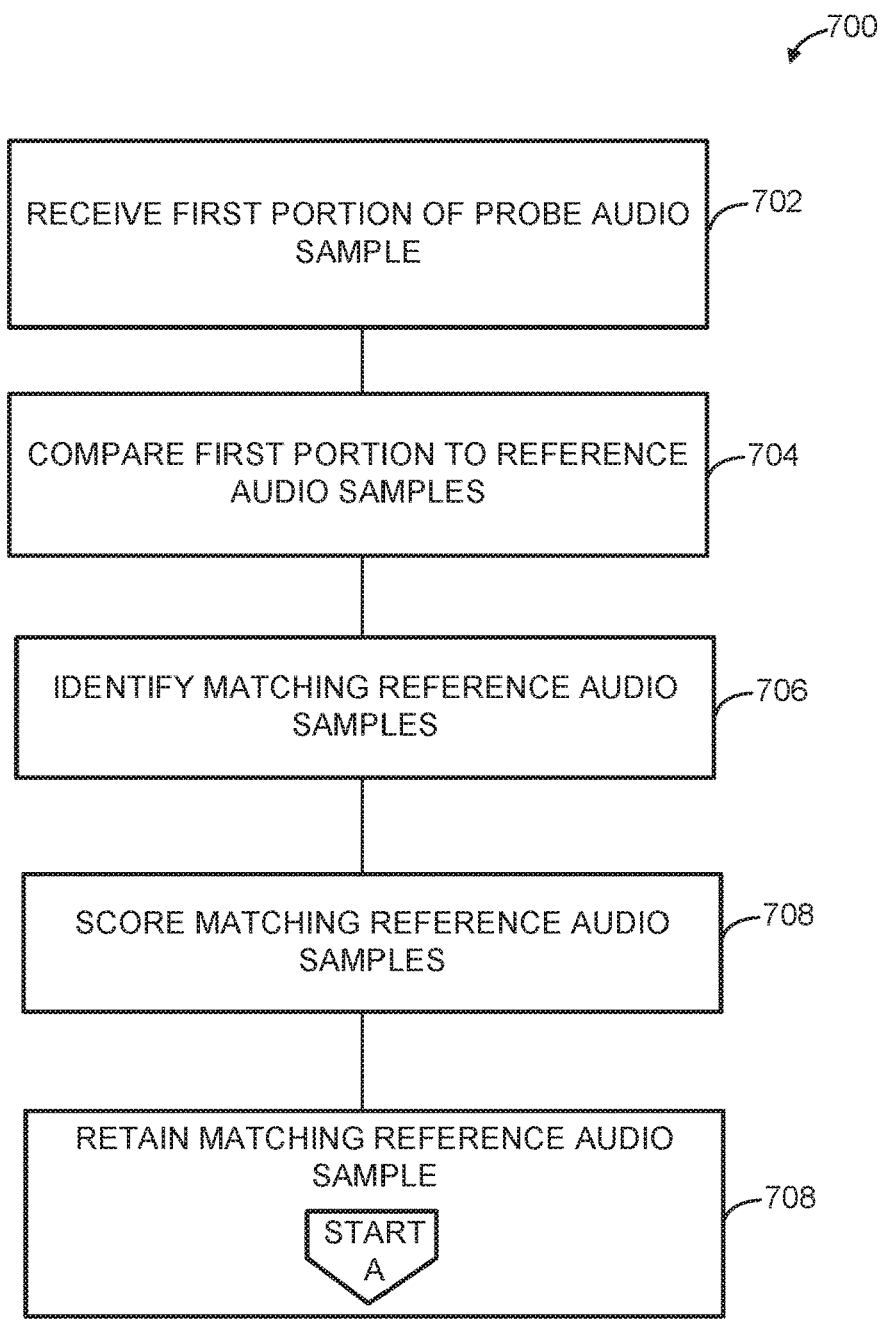
FIG. 7 illustrates a flow diagram of an example, non-limiting embodiment for processing matches of media content in accordance with various aspects and implementations described herein.
Figure 8:
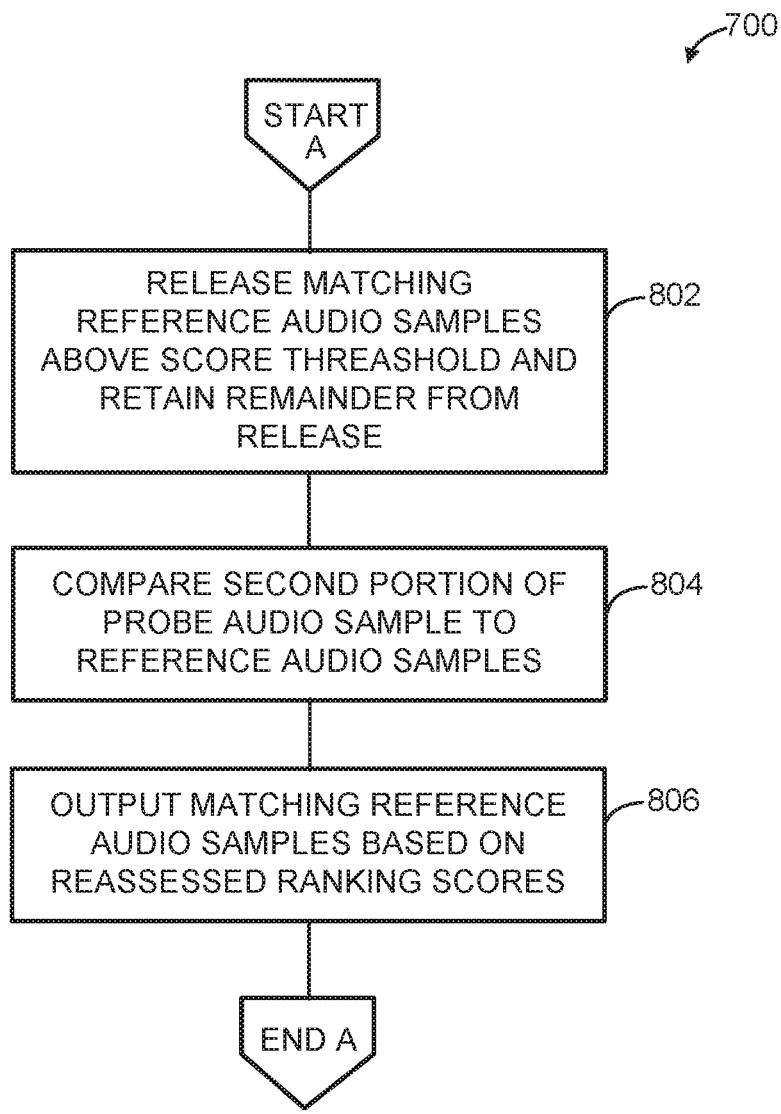
FIG. 8 illustrates a flow diagram of an example, non-limiting embodiment for live media streams in accordance with various aspects and implementations described herein.

Non-Limiting Examples of Methods for Hold Back and Real Time Ranking of Results in a Streaming Matching System FIGS. 6-8 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 6, illustrated is an example methodology 600 for a matching system in accordance with various embodiments disclosed. At reference numeral 602, a probe audio sample is received. The probe audio sample can include any comparison object of media content (e.g., audio, video, textual data, etc.) that can comprise a stream of media content, for example, as discussed above with respect to FIG. 2.

At reference numeral 604, the method 600 comprises comparing the probe audio sample to a plurality of reference audio samples to identify at least one matching reference audio sample. For example, the comparing of the probe audio sample to a plurality of reference audio samples to identify one or more matching reference audio samples can comprise generating a fingerprint of the probe audio sample and identifying respective fingerprints of the plurality of reference audio samples that match the fingerprint of the probe audio sample by at least a matching threshold or a sufficient match determination.

At reference numeral 606, respective ranking scores are assigned to the matching reference audio samples in response to identifying a plurality of matching reference audio samples. For example, the assigning of the respective ranking scores to the matching reference audio samples can comprise generating respective ranking scores based upon one or more measures/parameters. The parameters can comprise availability measures indicating whether the respective matching reference audio samples are individually available for sale, popularity measures indicating respective popularities of the matching reference audio samples, compilation measures indicating whether the respective matching reference audio samples are from an original album or a compilation album, and/or sales measures indicating respective sales amounts of the matching reference audio samples.

For example, the ranking scores can comprise a particular bit length such as thirty-two bit vectors or some other bit length that designates various parameter criteria by which to determine whether the matches are to be released as output results or not. In one example, a high bit can represent the availability measures (e.g., publically available for sale or not), other bits can represent popularity measures (e.g., heuristic data), such as web searches and/or number of views or downloads for the match reference result, other bits can indicate compilation measures or other metadata (e.g., if origination is an original extended play or a compilation album), bits for sales count data, and/or other criteria use to factor ranking scores.

In one embodiment, the resulting matches (e.g., matching reference audio samples) can be ranked based on the degree of correlation between fingerprinting or dimensional values, and then the ranked matches can be scored based on the set of parameters/measures discussed above.

In another embodiment, the method flow can continue by continuously comparing the probe audio sample to the plurality of reference audio samples after assigning the respective ranking scores to determine higher ranking matches among the plurality of matching reference audio samples than initially identified and/or to modify the rank scores already assigned. For example, additional portions of a probe sample could be further matched in order to generate further matching references and/or to identify additional features/dimensions in the comparison for a match. While a first set of matches from an initial amount of the sample could identify a number of matches, further amounts of the probe sample could strengthen or weaken the matches already determine as well as discover additional matches. For example, the parameters could be weakened or lowered for the retained matches if additional matches are discovered and/or a match rank against a match threshold is lowered from less features occurring than did with previous portions of the probe sample. The parameters, for example, could apply less or more to the retained match results where additional results lower the strength of the match (e.g., an audio remix or other altered recording, and/or the like media). Thus, by retaining the initial results from output, one or more matching references with a highest score rank can be outputted in response to further comparison analysis and have a greater confidence level than otherwise.

Referring now to FIG. 7, illustrated is an example methodology 700 for a matching system in accordance with various aspects described in this disclosure. At reference numeral 702, the method 700 comprises receiving, via a processor, a first portion of a probe audio sample. For example, a first portion could be determined from a set amount of time for receiving the probe sample, and/or an amount of the probe sample that is sufficient for matching operations to proceed (e.g., 1/50 of a media content, of a second, number of feature vectors detected, etc.).

At 704, the first portion of the probe sample is compared to a plurality of reference audio samples to identify a plurality of matching reference audio samples. At 706, one or more matching reference audio samples are identified that satisfy a sufficient match threshold.

At 708, the matching reference audio samples that satisfy the sufficient match threshold are scored based on a set of parameters.

At 710, the matching reference audio samples are retained from being outputted. In one embodiment, those reference that have respective assigned ranking scores that exceed a ranking or score threshold can be set for immediate release and not retained, while others are retained before release for further data to be received and/or further matching operations to occur, such as on additional portions or amounts of the probe sample. In another embodiment, a predefined number of matching reference results (e.g., matching audio sample results) can be set for release after the matching reference samples are retained for a time. Additionally or alternative, after a predefined amount of time of outputting matching reference audio samples that have respective ranking scores that exceed the ranking threshold, the method can continue by outputting the plurality of matching reference audio samples with respective assigned ranking scores that have been retained or without further retaining matches discovered, which can ensures that the optimal matches are released for output initially.

The act at 708 can further continue with reference to the method 800 of FIG. 8. At 802, matching reference audio sample can be released from being retained (e.g., by a data store or other memory) that are above or satisfy a score threshold, which is determined based on the parameters discussed above. At 804, a comparison can be generated for matching with a second portion of the probe audio sample to the plurality of reference audio samples to identify any additional matching reference audio samples, and/or to strengthen/weaken retained match reference results. The ranking scores can be continuously or iteratively reassessed based on further comparisons and on the set of parameters for the retained matching reference audio samples and also with any additional matching reference audio samples identified from second portions of the probe sample. At 806, matches can be released from being retained and/or for immediate release of additional matching results based on the reassessed ranking scores. In one example, a subset of the matching reference audio samples (the set including the retained matching results and the additional matching reference audio samples) that satisfy the score threshold greater than other matching reference audio samples of the set can be released as output. Afterwards, no further match results are necessarily retained, so that additional portions of the probe sample that generate matches can be immediately released as output without any retention or hold back. Alternatively, further results can continue being retained and reassessed by comparison to any additional matches matching reference audio samples and the additional matching reference audio samples.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in mechanisms as described for various embodiments of this disclosure.

Figure 9:
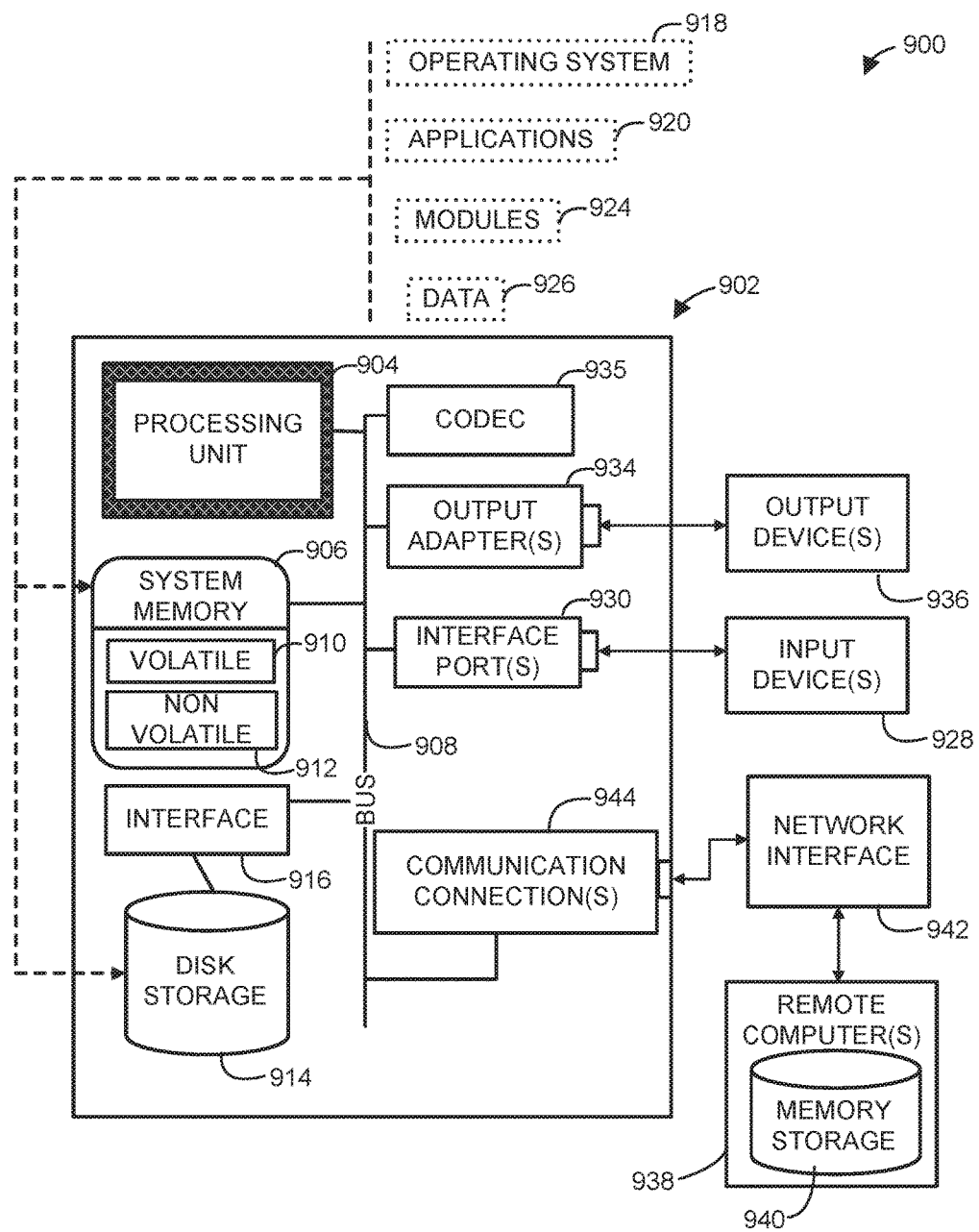
FIG. 9 is a block diagram illustrating an example computing device that is arranged in accordance with various aspects and implementations described herein.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 99, 912, etc. and computing objects or devices 920, 922, 924, 926, 928, etc. may comprise different devices, such as personal data assistants (PDAs), audio/video devices, mobile phones, MP3 players, personal computers, tablets, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation various embodiments of this disclosure.

There is a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 99, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 940 is the Internet, for example, the computing objects 910, 912, etc. can be Web servers with which the client computing objects or devices 920, 922, 924, 926, 928, etc. communicate via any of a number of known protocols, such as the hypertext transfer protocol (HTTP). Objects 910, 912, etc. may also serve as client computing objects or devices 920, 922, 924, 926, 928, etc., as may be characteristic of a distributed computing environment.

Exemplary Computing Device

As mentioned, advantageously, the techniques described herein can be applied to any device suitable for implementing various embodiments described herein. Handheld, portable, and other computing devices and computing objects of all kinds are contemplated for use in connection with the various embodiments, e.g., anywhere that a device may wish to read or write transactions from or to a data store. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
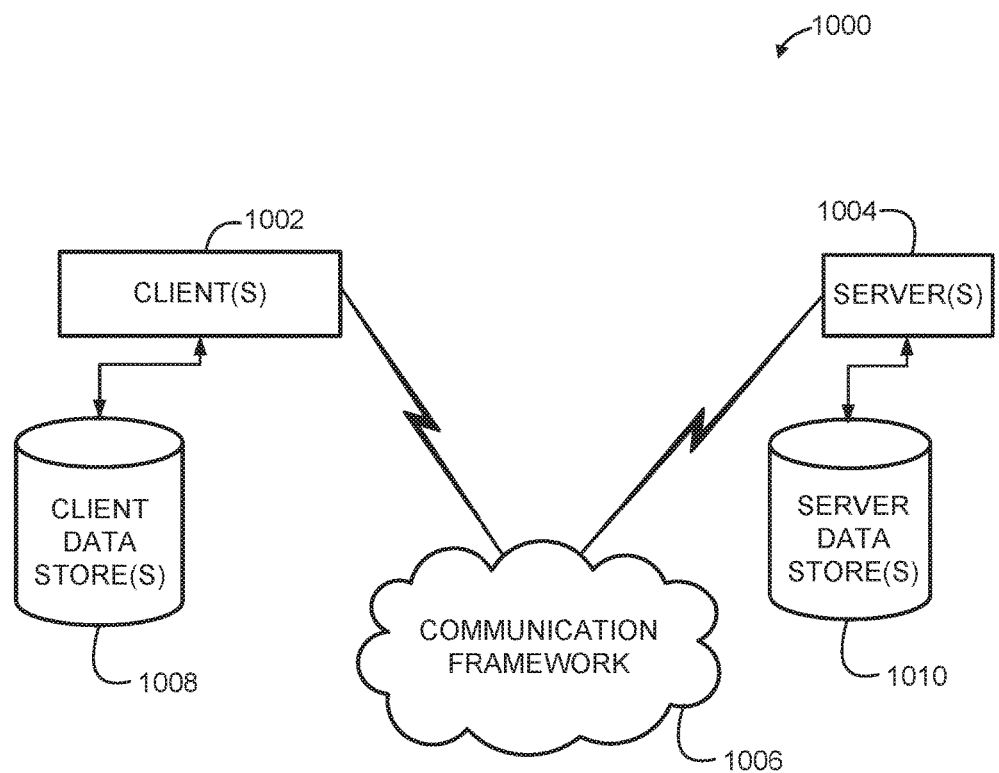
FIG. 10 is a block diagram illustrating an example networking environment in accordance with various aspects and implementations of this disclosure.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000.

With reference to FIG. 10, an exemplary remote device for implementing one or more embodiments includes a general-purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:
    using a processor to execute computer executable instructions stored on a non-transitory computer readable medium to perform operations comprising:
        receiving, from an audio streaming system, a probe audio sample;
        assigning first respective ranking scores to sufficiently matching reference audio samples based on a first comparison of a first portion of the probe audio sample to reference audio samples, wherein the first comparison comprises comparing feature vectors of the first portion of the probe audio sample to respective first feature vectors of the reference audio samples; and
        in response to determining that the sufficiently matching reference audio samples do not meet a predetermined score threshold:
            retaining the sufficiently matching reference audio samples;
            assigning second respective ranking scores to additional matching reference audio samples based on a second comparison of a second portion of the probe audio sample to the reference audio samples, wherein the second comparison comprises comparing feature vectors of the second portion of the probe audio sample to respective second feature vectors of the reference audio samples;
            updating the sufficiently matching reference audio samples using the first respective ranking scores and second respective ranking scores; and
            outputting at least one of the reference audio samples based on weighting of the first respective ranking scores and the second respective ranking scores.

2. The method of claim 1, wherein updating the sufficiently matching reference audio samples using the first respective ranking scores and second respective ranking scores comprises:
    updating ranking scores of the sufficiently matching reference audio samples.

3. The method of claim 1, wherein updating the sufficiently matching reference audio samples using the first respective ranking scores and second respective ranking scores comprises:
    adding, to the sufficiently matching reference audio samples,- matches from the additional matching reference audio samples.

4. The method of claim 1, further comprising:
    outputting a defined number of matching reference audio samples with respective highest assigned ranking scores.

5. The method of claim 1, further comprising:
    outputting ones of the sufficiently matching reference audio samples that have respective assigned ranking scores that exceed a defined ranking threshold.

6. The method of claim 1, wherein outputting at least one of the reference audio samples based on the weighted first and second set of ranking scores comprises:
    in response to a lapse of an amount of time for matching reference audio samples, outputting at least one of the sufficiently matching reference audio samples.

7. The method of claim 1, wherein identifying sufficiently matching reference audio samples based on the first comparison of the first portion of the probe audio sample to reference audio samples comprises:
    generating a fingerprint of the first portion of the probe audio sample, wherein the first portion of the probe audio sample is a time segment of the probe audio sample; and
    identifying respective fingerprints of time segment of the reference audio samples that match the fingerprint of the first portion of the probe audio sample by at least a defined matching threshold.

8. The method of claim 1, further comprising:
    discarding some of the sufficiently matching reference audio samples having respective second consistency scores that do not satisfy an additional threshold.

9. A system, comprising:
    a receiving component configured to receive, from an audio streaming service, a probe audio sample;
    a comparing component configured to compare a first portion of the probe audio sample to reference audio samples;
    a matching component configured to identify sufficiently matching reference audio samples based on a first comparison between feature vectors of the first portion of the probe audio sample and respective first feature vectors of the reference audio samples;
    a retaining component configured to retain the sufficiently matching reference audio samples based on a determination that none of the sufficiently matching reference audio samples meet a predetermined score threshold, the comparing component is further configured to:
        identify additional matching reference audio samples based a second comparison of feature vectors of a second portion of the probe audio sample to second feature vectors of the reference audio samples;
    a ranking component configured to:
        assign first respective ranking scores to the sufficiently matching reference audio samples based on the first comparison; and
        assign second respective ranking scores to the additional matching reference audio samples based on the second comparison; and
    a scoring component configured to:
        update the sufficiently matching reference audio samples using the first respective ranking scores and second respective ranking scores; and output at least one of the reference audio samples based on weighting of the first respective ranking scores and the second respective ranking scores.

10. The system of claim 9, wherein to update the sufficiently matching reference audio samples using the first respective ranking scores and second respective ranking scores comprises to:
update ranking scores of the sufficiently matching reference audio samples.

11. The system of claim 9, wherein to update the sufficiently matching reference audio samples using the first respective ranking scores and second respective ranking scores comprises to:
add, to the sufficiently matching reference audio samples, -matches from the additional matching reference audio samples.

12. The system of claim 9, wherein the first respective ranking scores or the second respective ranking scores are generated based on at least one from the group consisting of: whether the respective matching reference audio samples are individually available for sale, respective popularities of the sufficiently matching reference audio samples, whether the respective matching reference audio samples are from an original album or a compilation album, and respective sales amounts of the sufficiently matching reference audio samples.

13. The system of claim 9, further comprising:
a merging component that merges the sufficiently matching reference audio sample with at least one additional matching reference audio sample having second ranking scores from a sufficient match with a second time segment of the audio streaming content.

14. The system of claim 9, wherein the retaining component retains the sufficiently matching reference audio samples based on a set of defined parameters that include at least one of a time for comparison operations or an amount of the audio streaming content compared.

15. The system of claim 9, wherein the scoring component is further configured to discard the sufficiently matching reference audio samples that have second consistency scores that do not satisfy an additional threshold.

16. A non-transitory computer readable storage medium comprising computer executable instructions that, in response to execution, cause a computing system comprising a processor to perform operations, comprising:
receiving a probe sample;
comparing a first portion of the probe sample to reference samples to identify sufficiently matching reference samples based on a first comparison of feature vectors of the first portion of the probe sample and respective first feature vectors of the reference samples;
assigning first respective ranking scores to the sufficiently matching reference audio samples based on a first comparison; and
in response to determining that the sufficiently matching reference samples do not meet a predetermined score threshold:
retaining the sufficiently matching reference samples; and
comparing a second portion of the probe sample to the reference samples to identify additional matching reference samples based on a second comparison between feature vectors of the second portion of the probe sample and second feature vectors of the reference samples;
assigning second respective ranking scores to additional matching reference audio samples; and
outputting at least one of the reference samples based on weighting of the first respective ranking scores and the second respective ranking scores.

17. The non-transitory computer readable storage medium of claim 16, wherein probe sample is an audio probe sample, the reference samples are reference audio samples, and the feature vectors comprise audio fingerprints.

18. The non-transitory computer readable storage medium of claim 16, wherein probe sample is a text probe sample, the reference samples are reference text samples, and the feature vectors comprise word counts of various words.

* * * * *